United States Patent [19]

Shum

[11] Patent Number: 5,956,209
[45] Date of Patent: *Sep. 21, 1999

[54] INTEGRATED SUSPENSION FLEXURE HAVING A COMPLIANT TIP TERMINATION PLATFORM

[75] Inventor: Victor Wing Chun Shum, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,116

[22] Filed: Oct. 4, 1996

[51] Int. Cl.$^6$ ........................................ G11B 5/48
[52] U.S. Cl. ............................................ 360/104
[58] Field of Search ............................................ 360/104

[56] References Cited

U.S. PATENT DOCUMENTS

| | | | |
|---|---|---|---|
| H1424 | 4/1995 | Budde | 360/104 |
| 4,996,623 | 2/1991 | Erpelding et al. | 360/104 |
| 5,008,768 | 4/1991 | Carlson et al. | 360/104 |
| 5,166,845 | 11/1992 | Thompson et al. | 360/103 |
| 5,282,102 | 1/1994 | Christianson | 360/104 |
| 5,282,103 | 1/1994 | Hatch et al. | 360/104 |
| 5,377,064 | 12/1994 | Yaginuma et al. | 360/104 |
| 5,428,489 | 6/1995 | Takamure et al. | 360/104 |
| 5,452,158 | 9/1995 | Harrison et al. | 360/104 |
| 5,490,027 | 2/1996 | Hamilton et al. | 360/104 |
| 5,491,597 | 2/1996 | Bennin et al. | 360/104 |
| 5,597,496 | 1/1997 | Masaichi | 360/104 |
| 5,612,840 | 3/1997 | Hiraoka | 360/104 |
| 5,617,274 | 4/1997 | Ruiz | 360/104 |

FOREIGN PATENT DOCUMENTS

| | | | |
|---|---|---|---|
| 0-412739A2 | 2/1991 | European Pat. Off. | G11B 5/60 |
| 0-442225A2 | 8/1991 | European Pat. Off. | G11B 21/21 |
| 0-540283A2 | 5/1993 | European Pat. Off. | G11B 5/00 |
| 0-599669A2 | 6/1994 | European Pat. Off. | G11B 5/60 |
| 6-124558 | 10/1992 | Japan | G11B 21/21 |
| 6-215513 | 4/1993 | Japan | G11B 21/21 |
| 7-29340 | 1/1995 | Japan | G11B 21/21 |
| 7-29341 | 1/1995 | Japan | G11B 21/21 |
| WO93/17416 | 9/1993 | WIPO | G11B 5/48 |
| WO94/12974 | 6/1994 | WIPO | G11B 5/48 |
| WO94/16438 | 7/1994 | WIPO | G11B 5/48 |
| WO96/37883 | 11/1996 | WIPO | G11B 5/48 |

OTHER PUBLICATIONS

IBM TDB vol. 38 No. 05 May 1995 "Integrated Low Profile Suspension and Arm for Disk Files".

*Primary Examiner*—A. J. Heinz
*Attorney, Agent, or Firm*—Douglas B Millett; Noreen A. Krall

[57] ABSTRACT

An integrated suspension system for supporting a magnetic read/write slider comprising a load beam for supporting a slider, a flexure for connecting the load beam to a slider, the flexure including a bonding area upon which the slider is attached, a tip platform supporting the slider read/write element terminations, and a hinge-like compliance member for flexibly connecting the tip platform and the bonding area. The flexure further includes a pair of flexure legs which substantially enclose the slider bonding area, and a pair of tabs extend perpendicular from the flexure legs to support conductive elements electrically connecting the magnetic read/write slider to the disk drive controlling electronics.

20 Claims, 4 Drawing Sheets

INTEGRATED SUSPENSION FLEXURE HAVING A COMPLIANT TIP TERMINATION PLATFORM

BACKGROUND OF THE INVENTION

1. Technical Field

This invention relates generally to integrated lead suspension assembly for a data recording disk drive and more particularly to a flexure which connects a transducer to a load beam within an integrated suspension, which is capable of vertical and angular deformation to effect a desired mechanical and electrical connection between the integrated suspension leads and the transducer.

2. Description of the Prior Art

Direct access storage devices (DASD), such as disk drives, store information on concentric tracks of a rotatable magnetic recording disk. In order to read or record the desired information on a rotating disk, a magnetic head or other transducer element on a suspension arm is moved from track to track by a rotary or linear actuator. The suspension arm is part of a head suspension assembly that typically includes a load beam attached to an actuator arm, a flexible member known as a flexure connected to the load beam, and a transducer or magnetic head attached to the flexure. The magnetic heads, which actually read or write data on the disk, are positioned within an air bearing slider. While the disk rotates, the slider flies slightly above the surface of the rotating disk, the load beam supports the slider and the flexure allows it to gimbal to adjust its orientation for unavoidable disk surface run out or flatness variations. The combination flexure/transducer are often referred to as the head gimbal assembly.

Examples of suspension systems are shown in the following references: U.S. Pat. No. 5,491,597 to Bennin et al. issued Feb. 13, 1996; U.S. Pat. No. 5,490,027 to Hamilton et al., issued Feb. 16, 1996; U.S. Pat. No. 5,428,489 to Takamure et al., issued Jun. 27, 1995; U.S. Pat. No. 5,377,064 to Yaginuma et al., issued Dec. 27, 1994; U.S. Pat. No. 5,282,102 to Christianson, issued Jan. 25, 1994; U.S. Pat. No. 5,225,950 to Crane, issued Jul. 6, 1993; U.S. Pat. No. 5,198,945 to Blaeser et al., issued Mar. 30, 1993; U.S. Pat. No. 5,187,625 to Blaeser et al., issued Feb. 16, 1993; U.S. Pat. No. 5,115,363 to Khan et al., issued May 19, 1992; U.S. Pat. No. 4,996,623 to Erpelding et al., issued Feb. 26, 1991; U.S. Pat. No. 4,797,763 to Levy et al., issued Jan. 10, 1989; U.S. Pat. No. 4,761,699 to Ainslie et al., issued Aug. 2, 1988. European Patent Application Publication No. 0487914A2 to Foote et al., published Jun. 3, 1992; PCT Publication No. WO94/24664 for Jurgenson, published Oct. 27, 1994; PCT Publication No. WO 94/16438 for Budde, published Jul. 21, 1994; PCT Publication No. WO 94/12974 for Budde, published Jun. 9, 1994 and Japanese Patent Publication No. 59-207065 for Hashimoto, published Nov. 24, 1984.

As indicated by the prior art, in a conventional air-bearing slider-suspension assembly, the slider is mechanically attached to the flexure element of the suspension by epoxy bonding. The electrical connection between the transducer and the read/write electronics is made of twisted wires which run the length of the suspension load beam and extend over the flexure element and the slider. The ends of the wires are soldered or ultrasonically bonded to the transducer bonding areas or pads located on the slider. Another type of suspension is a composite or laminate structure with patterned electrical leads formed thereon. In the laminated suspensions, the slider is epoxy bonded to the laminated suspension and the transducer leads are formed on the suspension. Assignee's U.S. Pat. No. 4,761,699 describes a laminated suspension for use with a conventional slider wherein solder ball connections provide both the mechanical connection of the slider to the laminated suspension and the electrical connection of the transducer to the leads on the laminated suspension.

It is well known that a head gimbal assembly must provide a proper pivotal connection for the slider so that during operation, the slider can compensate for irregularities in manufacture and operation by pitching and/or rolling slightly in order to maintain the air bearing, while maintaining appropriate stiffness against yaw movement. Roll is defined as rotation about a longitudinal axis extending directly out from the actuator arm in the plane of the disk, and pitch is defined as rotation about an axis perpendicular to the roll axis but still lying in the plane of the disk. Yaw is gyration around an axis perpendicular to the air-bearing surface. In order to be useful, any flexure must achieve low enough pitch and roll stiffness for the air bearing flying height tolerances while at the same time achieving high enough yaw stiffness.

Another important consideration for a head gimbal assembly is that it must provide good dynamic characteristics. When the suspension is being actuated to seek a track or when it is being excited by external forces such as air flow, certain modes of vibration of the flexure can be excited. The mode of vibration of concern is the flexure leg out of phase bending mode. If this mode of vibration is excited, the suspension will exhibit large gain in the sway direction. Therefore, it is desirable to place this mode of vibration high in the frequency range to avoid any servo problem.

One of the problems associated with disk drives using a conductive base conventional suspension or laminated type suspension is the creation of a vertical displacement in a portion of the bonding area to which the slider is bonded by virtue of an insulating layer applied to suspension. An insulating layer is needed to prevent the magnetic head from being shorted when the slider bonding pads are bonded to the electrical leads or wires on the suspension. This vertical displacement defines a gap between the slider back surface and the flexure, which is encountered when attempting to bond the flexure to the slider.

There are several problems encountered as the result of this vertical displacement in the slider bonding area. For instance, when the slider is bonded to the flexure, the flexure tongue has to be flat with respect to the slider's back surface. If the distortion on the flexure tongue due to the vertical deflection is too excessive, the slider cannot be bonded securely to the flexure. During manufacturing, the slider is usually being held in a tool block when it is being bonded to the flexure. The suspension with the integrated flexure is then pressed down onto the slider. Part of the flexure will have to deflect a small amount in the vertical direction so that the back of the slider and the flexure tongue will be back to back for bonding. However, in doing so, internal forces and moments are created. Furthermore, after the slider is bonded, the epoxy is cured, and the suspension is taken out of the tool block, the internal forces and moments will rotate the flexure and bias the pitch and static attitude of the suspension.

Another drawback encountered in the prior art approach is that the amount of force available for bonding the slider to the flexure is the gram load of the suspension load beam. The tip of the flexure has to be compliant enough to be deformed vertically using no more than this amount of force. The smaller the amount of force is required for this deformation, the less resulting distortion and static attitude bias on the flexure.

Yet another disadvantage encountered as a result of the vertical displacement in the bonding area is the problem of tilting. It is known that when the tip of the flexure is displaced vertically, it will also tilt. This tilting is undesirable for several reasons. The tip of the flexure is a platform for slider read/write element terminations. The edge of the slider which contains the read/write elements and the flexure platform should ideally be perpendicular to each other. Any amount out of perpendicular will increase the termination tolerance. In addition, for a low profile suspension, the distance between the suspension load beam and the flexure is small. Any tilting at the tip of the flexure will decrease that small distance further and increase the chance of interference.

It therefore would be an advantage to provide an integrated suspension assembly wherein the flexure provides adequate support for the air-bearing slider while being compliant with the layers of the integrated suspension assembly. It would also be advantageous to provide a means to increase the frequency of the flexure leg out of phase bending mode of vibration without increasing the low pitch and roll stiffness required for flying height tolerance and at the same time increasing yaw stiffness.

SUMMARY OF THE INVENTION

In accordance with the objectives of this invention, as described above, and to overcome the limitations of the prior art, the present invention is a suspension system for supporting a slider in a disk drive comprising a load beam for supporting a slider, a flexure for connecting the load beam to a slider, the flexure including a bonding area upon which the slider is attached, a tip termination platform supporting the slider read/write element terminations, and a hinge-like compliance member for flexibly connecting the tip platform and the bonding area.

The flexure further includes a pair of substantially parallel flexible longitudinal legs, partially enclosing the slider mounting area. Each leg further comprises a small side tab, extending outward substantially perpendicular to the flexure longitudinal axis. A plurality of electrical leads are routed from slider termination pads located on the tip termination platform, alongside the flexure legs but connected to the side tabs, and then along the longitudinal axis of the flexure for connection to the controlling electronics.

In the preferred embodiment, the suspension is a laminate structure which includes a support layer, an insulating layer, and a conductive layer. The support layer is comprised of a non-magnetic, high strength material such as stainless steel, titanium, or beryllium copper. Overlaying the support layer in some areas of the suspension is an insulating layer comprised of an electrically insulated material such as polyimide, Teflon or epoxy. The electrical leads or traces are preferably copper or gold plated copper, and may be protected with an optional electrically insulating cover layer, for instance, polyimide.

The hinge-like compliance member is formed as part of the support layer, and flexibly attaches the flexure tongue to the tip termination platform. The compliance member functions as a cantilever element and is located along the central axis of the flexure, substantially parallel with the integrated traces.

In accordance with the present invention, when the suspension is pressed onto the slider for bonding, the flexure tip termination platform will be displaced vertically by an amount equal to the thickness of the insulating layer. This amount of displacement allows the slider back surface to be flush with the flexure support layer, allowing for a secure bond to form between the flexure and the slider. At the same time, the compliance member, since it is attached on one end to the tip platform, will also deform. The compliance member is designed such that it is soft enough in the displacement direction so that it complies with less than the gram load amount of force. The stiffness of the compliance member is designed to be in balance with the integrated traces routed from the flexure tip termination platform around the slider mounting area so that the tip termination platform will not tilt when it is displaced. The compliance member is also designed to have very low vertical stiffness so that the resulting static attitude change is minimized. Any resulting static attitude change which may occur will be in one direction and the amount will be predictable and therefore can be adjusted by some static attitude adjustment method farther on in the manufacturing process. In addition, since the compliance member is located along the center axis of the flexure, the deformation of the complaince member creates no moment to bow the flexure tongue in the transverse direction. Therefore, the flexure bonding area remains flat with respect to the slider back surface, which results in good slider bonding.

Still in accordance with the preferred embodiment, angular compliance may also be desired to either side of the hinge like compliance member. In the slider attach process, this angular compliance may be necessary to align the electrical leads with pre-disposed solder bumps on the front face of the slider. To this end, the integrated suspension further includes a pair of secondary compliance members, each extending outward from the end of, and at a right angle to the hinge like compliant member. The secondary compliance members are also cantilever members which connect the distal end of the compliance member with the tip termination pads.

BRIEF DESCRIPTION OF THE DRAWINGS

Referring now to the drawings in which like reference numbers represent corresponding parts throughout.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
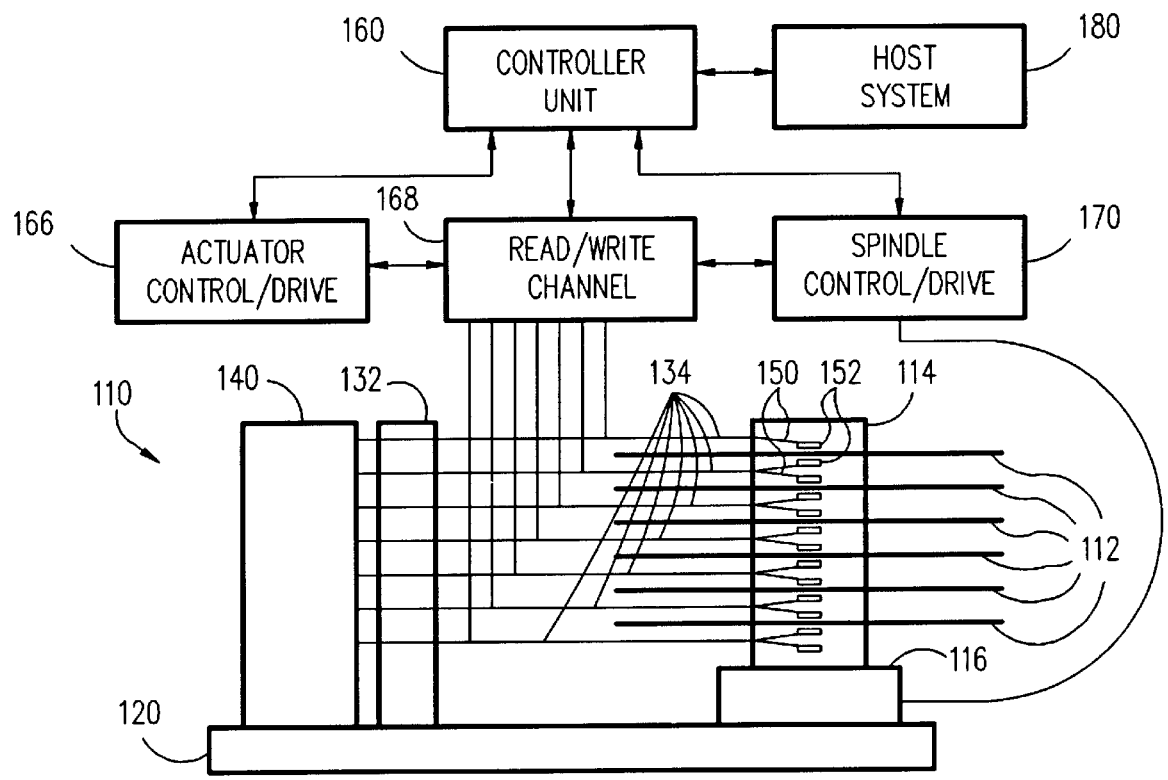
FIG. 1 is a side view of a disk drive system and a controller unit in block form.
Figure 2:
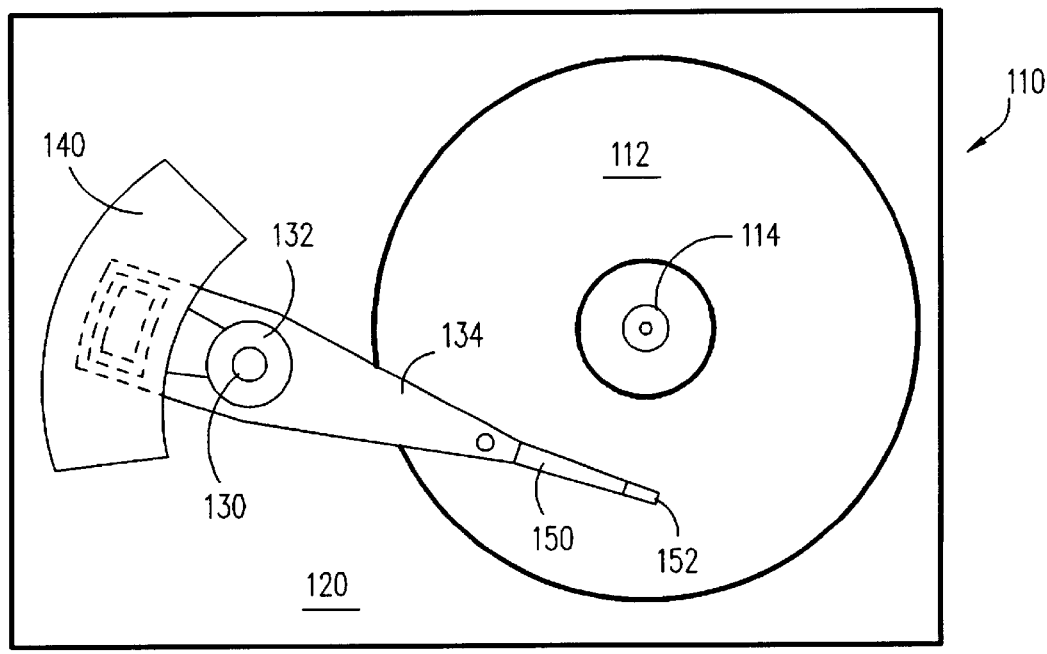
FIG. 2 is a top view of one disk drive system.

FIGS. 1 and 2 show a side and a top view, respectively, of a disk drive system designated by the general reference number 110. The disk drive system 110 comprises a plurality of stacked magnetic recording disks 112 mounted to a spindle 114. The disks 112 may be conventional particulate or thin film recording disks or, in other embodiments, they may be liquid bearing disks. The spindle 114 is attached to a spindle motor 116 which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of suspension assemblies 150 are attached to the actuator arms 134. A plurality of transducer heads, or sliders 152 are attached respectively to the suspension assemblies 150. The sliders 152 are located proximate to the disks 112 so that, during operation, they are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the rotary voice coil motor 140. This configuration allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in *The Magnetic Recording Handbook*, C. Dennis Mee and Eric D. Daniel, McGraw-Hill Book Company, 1990.

Figure 3:
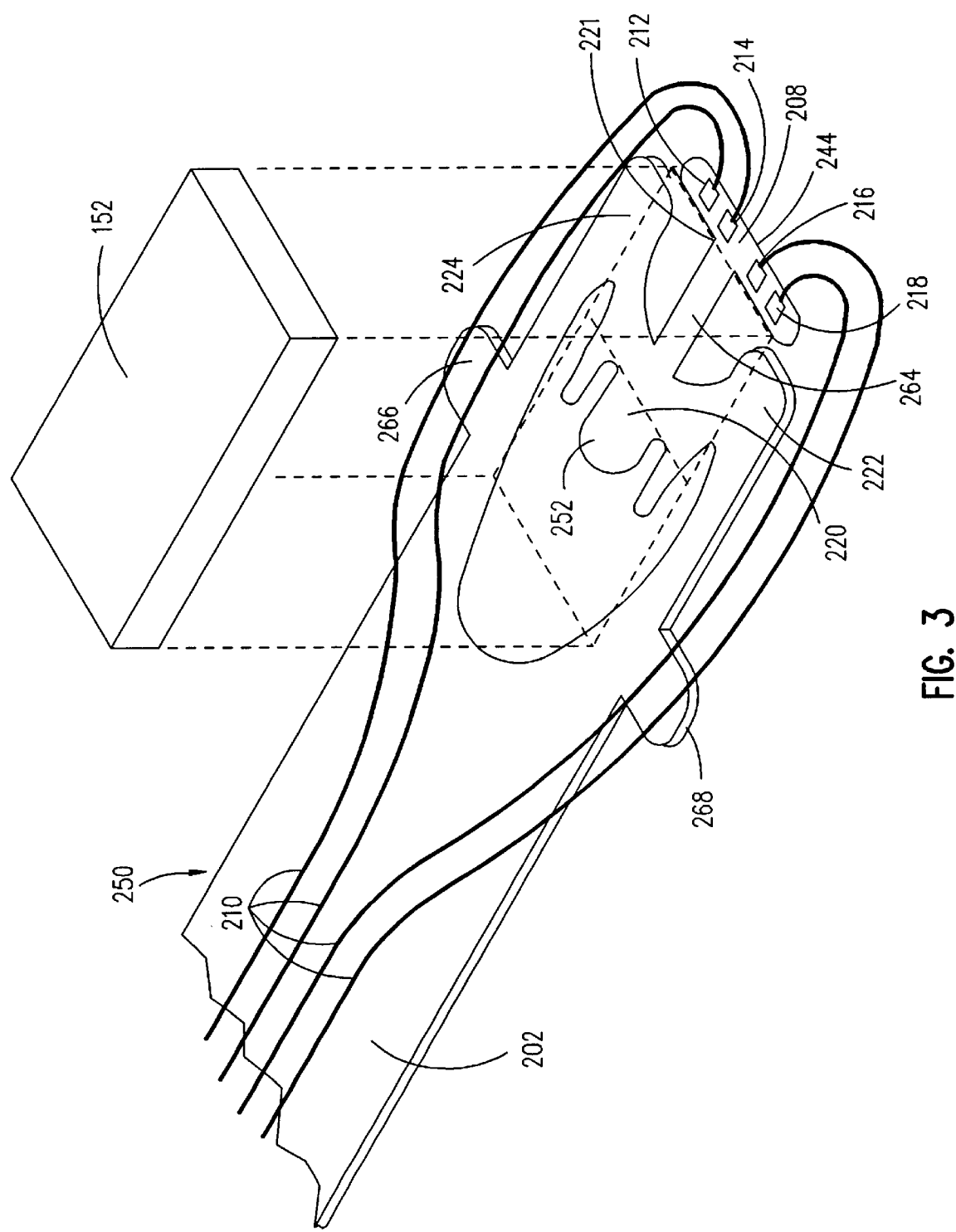
FIG. 3 is a side, perspective view of a preferred embodiment of the suspension assembly in accordance with the present invention.
Figure 4:
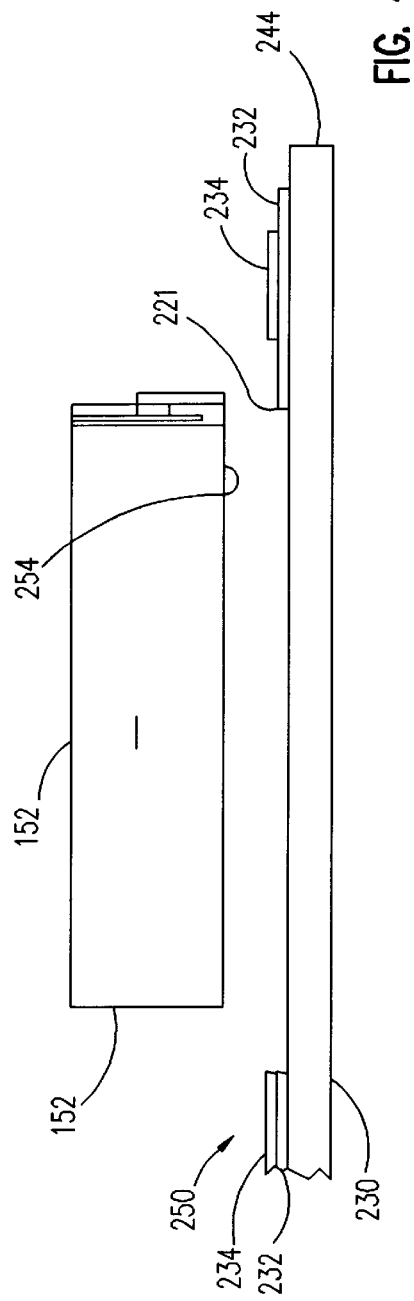
FIG. 4 is a side cross sectional view of the suspension assembly in accordance with the present invention before the slider is attached to the suspension.
Figure 5:
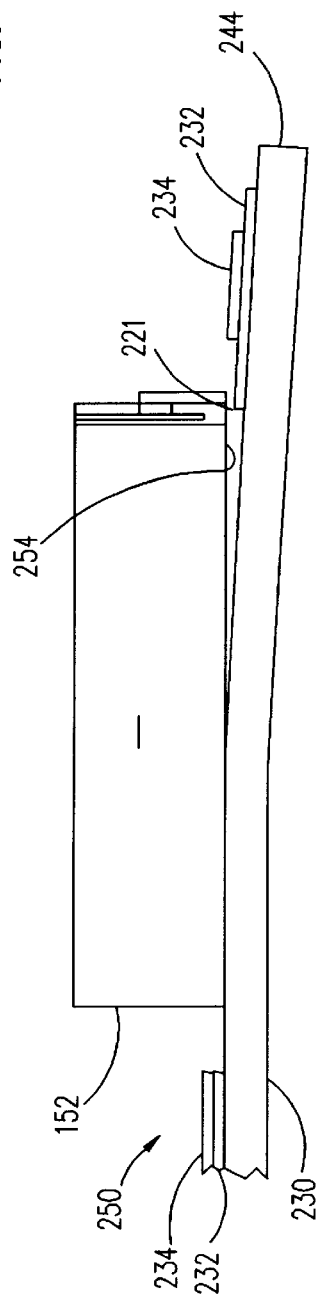
FIG. 5 is a side cross sectional view of the suspension assembly in accordance with the present invention showing the slider being bonded to the suspension.
Figure 6:
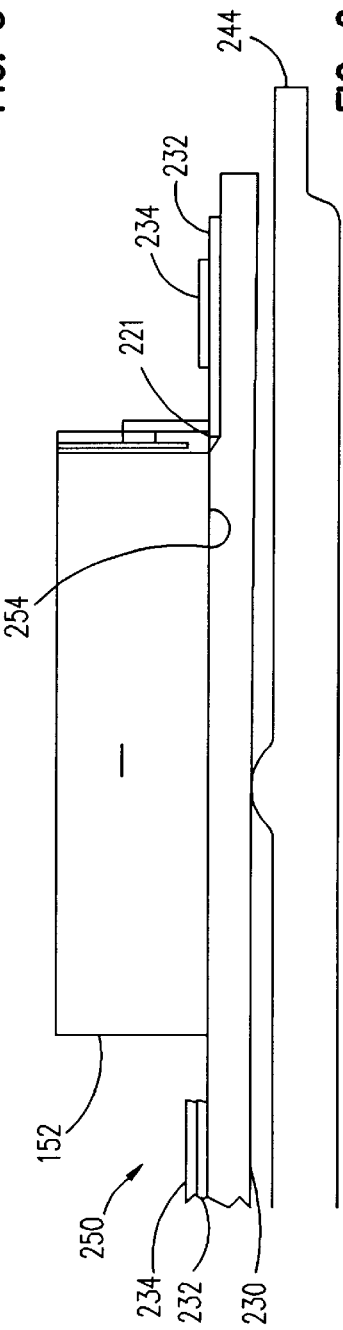
FIG. 6 is a side cross sectional view of the suspension assembly showing the slider bonded to the suspension assembly.
Figure 7:
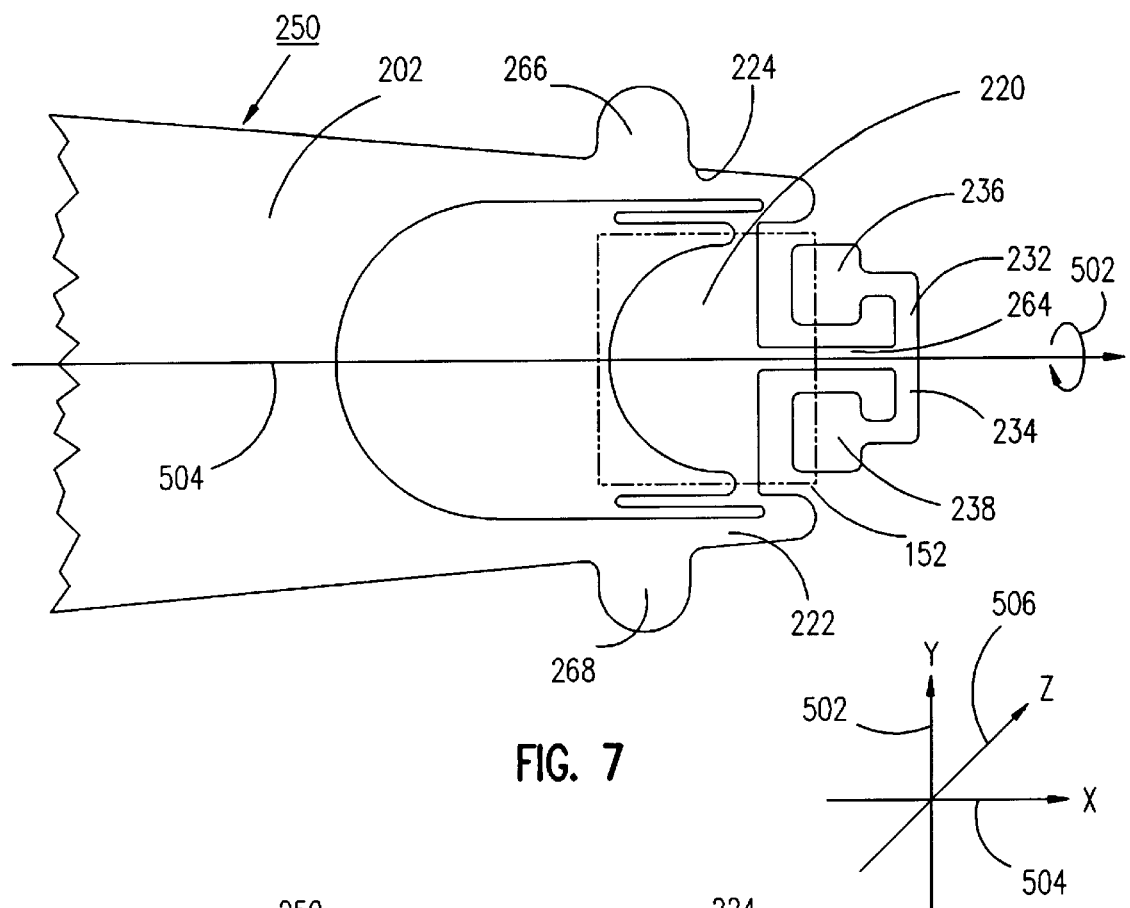
FIG. 7 is a bottom plan view of a preferred embodiment of the suspension assembly in accordance with the present invention.
Figure 8:
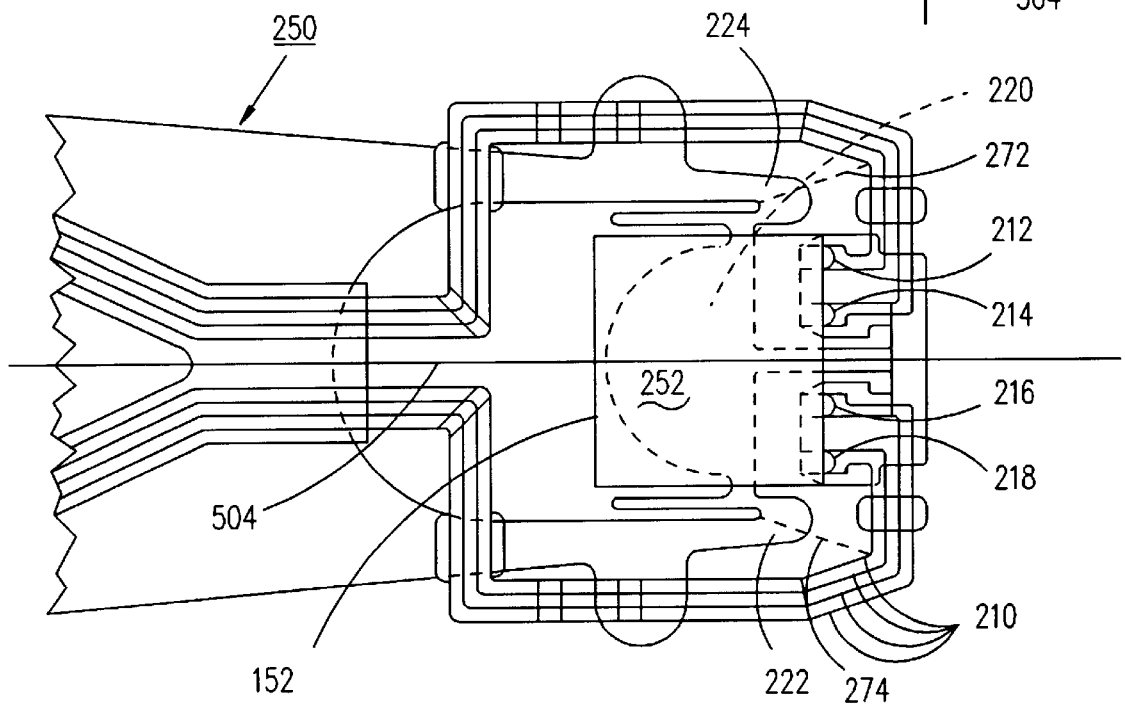
FIG. 8 is a top plan view of a preferred embodiment of the suspension assembly in accordance with the present invention, showing the conductive leads patterned thereon.

FIGS. 3 to 8 show various views of the preferred embodiment of the suspension assembly in accordance with the present invention. Particularly, FIG. 3 is a perspective view. FIGS. 4 to 6 are cross-sectional views along the center of the flexure, FIG. 7 is a bottom plan view, and FIG. 8 is a top plan view.

With reference to FIG. 3, it is seen that the flexure 250 of the present invention is comprised of a main flexure body 202, a slider supporting flexure tongue 220, and a flexure tip platform 208 which is flexibly connected to the flexure tongue 220 by compliance member 264. In the first preferred embodiment, the compliance member is rectangular in shape and is approximately 0.1 mm in width by 0.65 mm in length. The bonding area for the slider, 152 indicated in shadow and referenced generally by numeral 252, encompasses substantially the flexure tongue 220.

Referring now to FIGS. 4 to 6, it can be seen that flexure 250 is a multilayered structure comprised of a first layer 230, a second layer 232, and a third layer 234. The first layer 230 extends the length of the flexure 250 and is positioned adjacent to one surface of the second layer 232. The second layer overlies the first layer from the distal end 221 of the compliance member to the distal end 244 of the tip platform 208. The third layer 234, is positioned adjacent to one surface of the second layer 232 and defines termination pads 212, 214, 216 and 218 thereon, so that the second layer 232 separates the first layer 230 from the third layer 234, with the layers 230, 232, and 234 all lying in planes that are parallel to each other. The three layers of the flexure function as follows: The first layer 230 is a stiffer layer that gives rigidity to the suspension assembly 150. The second layer 232 is comprised of a dielectric material that functions as an electrical insulator between the first layer 230 and the third layer 234. The third layer 234, also defining the conductive traces 210, is preferably comprised of a high conductivity alloy (e.g. copper alloy) because the read/write element terminations need to function as efficient electrical conductors.

Representative dimensions and compositions for the various elements illustrated in FIGS. 4 to 6 are as follows: In a preferred embodiment, the first layer 230 has a thickness in the range of approximately 0.051 millimeters and comprises full hard 301, 302 or 304 stainless steel. In more general terms, the first layer 230 has a thickness of approximately 0.076 millimeters or less and comprises a rigid material such as stainless steel. Although typically the first layer comprises 300 series stainless steel, other rigid materials could also be used (e.g. beryllium copper or titanium).

In a preferred embodiment, the second layer 232 comprises a polyimide that has properties similar to the properties of Kapton® E brand polyimide manufactured by E.I. DuPont de Nemours and Company, including a dielectric constant in the range of approximately 3.0 to 3.5. Additionally, in a preferred embodiment, the second layer 232 has a thickness of 0.018 millimeters or less, and the coefficient of thermal expansion (CTE) of the polyimide should be such that the laminate will be in a neutral stress condition after the laminate is manufactured.

In a preferred embodiment, the third layer 234 has a thickness in the range of 0.0178 millimeters, and comprises a copper-nickel-silicon-magnesium alloy such as the copper alloy C7015 with a TMO3 temper (full hard heat temper) manufactured by Olin Brass (composition 96.2–98.4% Cu; 3% Ni; 0.65% Si; and 0.15% Mg). In more general terms, the third layer comprises a high strength electrically conducting material and has a thickness of approximately 0.018 millimeters or less.

Still with reference to FIGS. 4 to 6, more generally stated, the compliance member 264 has a length in the range of 0.3–1.0 mm and a width in the range of 0.075–0.3 mm. The thickness of the compliance member is the same as the thickness of the first layer 230, the supporting layer. It is understood that the dimensions described are meant to be exemplary and not limiting. For example, in an alternative embodiment, the compliance member 264 may be longer and thinner or shorter and thicker, depending upon the desired operational parameters of the suspension. Likewise, the compliance member may be shaped in the alternative like a diamond, or slightly bowed in the center rather than rectangular or squared in shape. Further, the compliance member may be comprised of more than one hinge like elements flexibly connecting the slider bonding area 252 on the flexure 250 to the tip platform 208, as will be shown and described in connection with FIGS. 7 and 8.

In accordance with the present invention and as shown in connection with FIGS. 4 to 6, when the suspension 150 is pressed onto the slider 152 for bonding, the flexure tip platform 208 will be displaced vertically by an amount equal to the thickness of the second layer 232. This amount of displacement allows the slider back surface 254 to be flush with the first layer 230, with no gap present, allowing for a secure bond to form between the flexure 250 and the slider 152. At the same time, the compliance member 264, since it is attached to the proximal end 221 of the tip platform 208, will also deform. The compliance member 264 is designed such that it is soft enough in the displacement direction 504 so that it complies with less than the one gram load amount of force. The stiffness of the compliance member 264 is also designed to have very low vertical stiffness so that the resulting static attitude change of the suspension is minimized. Any resulting static attitude change will be in one direction and will be predictable and therefore can be adjusted by some static adjustment method farther on in the manufacturing process.

Referring now to FIGS. 7 and 8, for reference purposes, a line (longitudinal center line) 504 is shown, which denotes the geometric center of the flexure 250 in the longitudinal direction. In a preferred embodiment, the longitudinal center line bisects the flexure into two approximately symmetrical halves so that the weight of the flexure 250 is balanced about line 504. It can also be seen that the compliance member 264 is located along the center axis 504 of the flexure 204, so that deformation of the compliance member 264 creates no moment to bow the flexure tongue 220 in the transverse direction 506. As the slider 152 is bonded to the flexure 250, the compliance member 264 holds the flexure tongue 220 flat with respect to the slider back surface 254, which results in good slider 152 bonding.

This positioning of the compliance member 264 also allows for uniform pitching and rolling action about the center of the slider 152. Pitch is defined as the rotation of the slider 152 about axis 502 that is perpendicular to the center line 504. Roll is defined as the rotation about the center line 504 as indicated by curved arrow 506.

With reference now to FIG. 8, which is a top plan view of a flexure in accordance with the present invention, a slider 152 is shown where it is positioned on the flexure tongue 220, compliance member 264 and left and right tip platforms 236 and 238, collectively, the bonding area 252. Particularly, the slider 152 is bonded to the flexure 150 on its lower surface 254 by a suitable means, such as an adhesive. The slider 152 rests also on the bottommost point of the load beam dimple 238. The slider 152 is bonded to the flexure 250 such that the contact pads on the end face of the slider 152 are in close proximity and aligned with bonding pads 212, 214, 216 and 218 on tip platforms 236 and 238. A plurality of copper and polyimide traces 210 are routed from the bonding pads 212, 214, 216 and 218 on the tip platforms 236 and 238, outside the flexure legs 222, 224 and then down the main flexure body 202 for connection to the disk drive electronics.

With continued reference to FIG. 8, the length of conductive traces 210 alongside of the flexure legs 222 and 224 is supported by the side tabs 266, 268, which are integrally formed with the base layer 230 of the flexure 250. The side tabs 266, 268 serve to reduce the unsupported free lengths of the traces 210 and therefore have effectively increased the yaw stiffness of the flexure 250 by making a shorter loop between the side tabs 266, 268, the compliance member 264 and the tip platform 208. The placement of the side tabs 266, 268 is designed such that it will not increase the pitch and roll stiffness of the flexure appreciably. In order to minimize the impact to the pitch and roll stiffness, the side tabs 266, 268 are placed at some distance from the two radius 272, 274 indicating the top of the flexure legs. In a preferred embodiment, the distance is in the range of 0.5 mm, however this distance may vary between designs and applications. The side tabs 266, 268 have a thickness equal to the thickness of the base layer 230 of the flexure 250, and has a width in the range of 0.1 mm to 0.5 mm. Preferably, the width is 0.2 mm. The side tabs protrude outward from the flexure legs approximately 0.25 mm, although this distance may be increased up to 1 mm, depending on the desired operational characteristics of the suspension.

The hinge-like compliance member 264 is able to flexibly attach the tip platforms 236 and 238 and the flexure tongue 220 such that when the suspension 150 is pressed onto the slider 152 for bonding, the flexure tip 244 will be displaced vertically by the amount equal to the thickness of the second layer 232 of the flexure 250. This amount of displacement allows the lower surface 254 of the slider 152 to be flush with the first layer 230 of the flexure 250, allowing for a strong adhesive bond between the slider lower surface 254 and the first flexure layer 230. However, at the same time, the compliance member 264 will also deform, so that the compliance member 264 will be in balance with the integrated traces 210 routed from the flexure tip platform 208 around the slider mounting area 252 so that the tip platform 208 will not tilt when it is displaced. Stated another way, the tip platform 208 is raised slightly in parallel when the slider 152 is bonded to the flexure 250.

With reference still to FIGS. 7 and 8, it is seen that the flexure 250 also includes a pair of secondary compliance members, 232 and 234, which extend outward from the end of and at right angles to the compliance member 264. These secondary complaince members 232 and 234 terminate at top platforms 236 and 238 respectively. These secondary compliance members provide left and right compliance to the flexure 250 which further improves the alignment between termination pads 212, 214, 216, and 218 with the read/write element termination pads on the slider front face.

While the preferred embodiments of the present invention have been illustrated herein in detail, it should be apparent that modifications and adaptations to those embodiments may occur to those skilled in the art without departing from the scope of the present invention as set forth in the following claims.

I claim:

1. A data recording disk drive comprising:

a disk with a data surface of concentric data tracks;

means attached to the disk for rotating the disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks;

an electronics module for processing data read from and written to the data surface;

a suspension comprising a load beam, a flexure connected to said load beam, said flexure comprising a tongue, a tip platform, and a cantilever compliance member extending from said tongue flexibly connecting said tip platform and said tongue wherein said flexure is a laminate structure comprising a support layer, an electrically conductive layer formed on the support layer as a plurality of electrically conductive traces interconnecting said slider and said electronics module, each of said conductive traces having a bonding area near each of its ends for electrical connection to the slider and the disk drive controlling electronics, and an insulating layer of dielectric material deposited on a base layer to insulate said bonding areas; and a generally rigid support arm having two ends, its first end attached to the suspension and its second end attached to the actuator.

2. The data recording disk drive of claim 1, wherein the support layer comprises a stainless steel material and is 0.076 mm or less in thickness.

3. The data recording disk drive of claim 1, wherein the insulating layer comprises polyimide and is 0.018 or less in thickness.

4. The data recording disk drive of claim 1, wherein the electrically conductive layer comprises an electrically conductive material selected from the group consisting of Cu—Ni—Si—Mg alloy, Be—Cu—Ni alloy and Cu—Ti alloy.

5. The data recording disk drive of claim 1, wherein the electrically conductive layer is approximately 0.018 mm or less in thickness.

6. The data recording disk drive of claim 1, wherein said compliance member has a length in the range of 0.3 mm to 1.0 mm.

7. The head suspension assembly of claim 1, wherein said compliance member has a thickness in the range of 0.075 mm to 0.3 mm.

8. The data recording disk drive of claim 1, wherein said flexure further comprises a pair of flexure legs including a first flexure leg and a second flexure leg substantially enclosing said flexure tongue.

9. The data recording disk drive of claim 8, further comprising a pair of tabs extending from said flexure legs and supporting said electrically conductive traces.

10. The data recording disk drive of claim 9, wherein said tabs extend substantially perpendicular to said flexure legs, and are located 0.5 mm from the top of the flexure legs.

11. A head suspension assembly for a data storage device comprising:

a load beam;

a flexure connected to said load beam, said flexure comprising a tongue, a tip platform, and a cantilever compliance member extending from said tongue flexibly connecting said tip platform and said tongue wherein said flexure is a laminate structure comprising a support layer, an electrically conductive layer formed on the support layer as a plurality of electrically conductive traces interconnecting a slider and an electronics module, each of said conductive traces having a bonding area near each of its ends for electrical connection to the said slider and said electronics module, and an insulating layer of dielectric material deposited on a base layer to insulate said bonding areas.

12. The assembly of claim 11, wherein the support layer comprises a stainless steel material and is 0.076 mm or less in thickness.

13. The assembly of claim 11, wherein the insulating layer comprises polyimide and is 0.018 or less in thickness.

14. The assembly of claim 11, wherein the electrically conductive layer comprises an electrically conductive material selected from the group consisting of Cu—Ni—Si—Mg alloy, Be—Cu—Ni alloy and Cu—Ti alloy.

15. The assembly of claim 11, wherein the electrically conductive layer is approximately 0.018 mm or less in thickness.

16. The assembly of claim 11, wherein said compliance member has a length in the range of 0.3 mm to 1.0 mm.

17. The assembly of claim 11, wherein said compliance member has a thickness in the range of 0.075 mm to 0.3 mm.

18. The assembly of claim 11, wherein said flexure further comprises a pair of flexure legs including a first flexure leg and a second flexure leg substantially enclosing said flexure tongue.

19. The assembly of claim 18, further comprising a pair of tabs extending from said flexure legs and supporting said electrically conductive traces.

20. The assembly of claim 19, wherein said tabs extend substantially perpendicular to said flexure legs, and are located 0.5 mm from the top of the flexure legs.

* * * * *